United States Patent
Huang et al.

(10) Patent No.: US 11,764,578 B1
(45) Date of Patent: Sep. 19, 2023

(54) CONTROL METHOD FOR ENERGY-STORAGE APPARATUS, ENERGY-STORAGE APPARATUS, AND STORAGE MEDIUM

(71) Applicants: Shenzhen Hairun New Energy Technology Co., Ltd., Guangdong (CN); Xiamen Hithium Energy Storage Technology Co., Ltd., Fujian (CN)

(72) Inventors: Yingxiong Huang, Guangdong (CN); Yongfei Zhang, Guangdong (CN)

(73) Assignees: Shenzhen Hairun New Energy Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/310,064

(22) Filed: May 1, 2023

(30) Foreign Application Priority Data

Nov. 15, 2022 (CN) .......................... 202211441978.2

(51) Int. Cl.
*H02J 3/04* (2006.01)
*G01W 1/10* (2006.01)
(Continued)

(52) U.S. Cl.
CPC ................. *H02J 3/04* (2013.01); *G01W 1/10* (2013.01); *H02J 13/00002* (2020.01); *H02J 50/80* (2016.02)

(58) Field of Classification Search
CPC ........ H02J 3/04; H02J 13/00002; H02J 50/80; H02J 3/381; G01W 1/10; Y02E 10/56
See application file for complete search history.

(56) References Cited

U.S. PATENT DOCUMENTS

2023/0113916 A1* 4/2023 Park ...................... H02J 7/0063
307/124

FOREIGN PATENT DOCUMENTS

| CN | 108767866 A | 11/2018 |
| CN | 109149548 A | 1/2019 |

(Continued)

OTHER PUBLICATIONS

CNIPA, First Office Action for Chinese Patent Application No. 202211441978.2, dated Dec. 30, 2022, 31 pages.
(Continued)

*Primary Examiner* — Michael C Zarroli
(74) *Attorney, Agent, or Firm* — IP Spring

(57) ABSTRACT

A control method for an energy-storage apparatus, an energy-storage apparatus, and a storage medium are provided. The energy-storage apparatus supplies power to electrical devices, establishes a communication connection with a terminal bound to a target user, and includes a high-voltage box including a controller, and multiple energy-storage modules. The method includes: obtaining, by the controller, a current power of the energy-storage apparatus; determining, by the controller, power consumption of the energy-storage apparatus when the energy-storage apparatus normally supplies multiple the electrical devices in a future preset period; generating, by the controller, prompt information or an adjustment scheme of a running strategy for the energy-storage apparatus according to the current power of the energy-storage apparatus, the power consumption, and weather information of a location of the energy-storage apparatus in the future preset period; and controlling, by the controller, the energy-storage apparatus according to the adjustment scheme.

18 Claims, 5 Drawing Sheets

(51) Int. Cl.
*H02J 13/00* (2006.01)
*H02J 50/80* (2016.01)

(56) References Cited

FOREIGN PATENT DOCUMENTS

| | | |
|---|---|---|
| CN | 110288111 A | 9/2019 |
| CN | 112737086 A | 4/2021 |
| CN | 113221094 A | 8/2021 |

OTHER PUBLICATIONS

CNIPA, Notice of Allowance for Chinese Patent Application No. 202211441978.2, dated Feb. 3, 2023, 4 pages.

\* cited by examiner

CONTROL METHOD FOR ENERGY-STORAGE APPARATUS, ENERGY-STORAGE APPARATUS, AND STORAGE MEDIUM

CROSS-REFERENCE TO RELATED APPLICATIONS

This application claims priority under 35 U.S.C. § 119(a) to and the benefit of Chinese Patent Application No. 202211441978.2, filed Nov. 15, 2022, the entire disclosure of which is incorporated herein by reference.

TECHNICAL FIELD

This application relates to automation technology and is applied to the fields such as the Internet, a new energy-storage system, etc., and particularly to a control method for an energy-storage apparatus, an energy-storage apparatus, and a storage medium.

BACKGROUND

In real life, an energy-storage apparatus is generally operated according to a set running strategy of a battery management system (BMS). The BMS mainly manages charge and discharge of a power battery in a fixed time period by controlling positive and negative contactors of the power battery, but this operation mode is relatively fixed and not intelligent enough, which is prone to cause an insufficient remaining power of the energy-storage apparatus. When the remaining power of the energy-storage apparatus in a user's home is insufficient, if the weather is abnormal (e.g., the weather at a location of the energy-storage apparatus in a preset period shows a continuous high-temperature red warning signal or a continuous storm orange warning signal), the abnormal weather may result in a situation in which the mains power cannot supply the energy-storage apparatus and the user does not have sufficient electrical energy storage. In addition, the user also needs to constantly pay attention to the electrical energy storage to determine whether the remaining power of the energy-storage apparatus is sufficient, and this method, however, is inefficient.

SUMMARY

In the first aspect, implementations of the disclosure provide a control method for an energy-storage apparatus. The method is applied to the energy-storage apparatus and electrical devices. The energy-storage apparatus supplies power to the electrical devices and includes a positioning device, a high-voltage box, and multiple energy-storage modules. The high-voltage box includes a controller. The energy-storage apparatus establishes a communication connection with a terminal bound to a target user. The method includes: obtaining, by the controller, a current power of the energy-storage apparatus; determining, by the controller, power consumption of the energy-storage apparatus when the energy-storage apparatus normally supplies the electrical devices in a future preset period; obtaining, by the positioning device, current weather information of a location of the energy-storage apparatus; predicting weather information of the location of the energy-storage apparatus in the future preset period by inputting, by the controller, the current weather information and parameter information affecting the current weather information into a weather prediction model, where the parameter information affecting the current weather information includes temperature and humidity, the weather prediction model is a model trained with a plurality of sample data, the weather prediction model provides accurate mapping between an input and a desired output, the sample data includes feature data and label data, the label data includes historical weather information in a preset period, and the feature data includes parameter information affecting the historical weather information; generating, by the controller, prompt information or an adjustment scheme of a running strategy for the energy-storage apparatus, according to the current power of the energy-storage apparatus, the power consumption, and the weather information of the location of the energy-storage apparatus in the future preset period; and controlling, by the controller, the energy-storage apparatus according to the adjustment scheme; controlling, by the controller, the energy-storage apparatus according to the adjustment scheme includes: switching, by the controller, according to a preset discharge priority, a non-essential electrical device among the electrical devices from a normal operation state to an off state, to enable the energy-storage apparatus to normally supply an essential electrical device, when the current power of the energy-storage apparatus is lower than the power consumption and the number of days of abnormal weather in the weather information in the future preset period is greater than a first preset threshold; charging, by the controller, the energy-storage apparatus continuously until the current power of the energy-storage apparatus is higher than the power consumption; and controlling, by the controller, continuous discharge of the energy-storage apparatus, when the current power of the energy-storage apparatus is higher than the power consumption and the number of days of normal weather in the weather information in the future preset period is greater than the first preset threshold.

In the second aspect, implementations of the disclosure provide an energy-storage apparatus. The energy-storage apparatus includes a transceiver, a controller, and a memory. The memory stores computer programs which, when called by the controller, are operable to: obtain a current power of the energy-storage apparatus; determine power consumption of the energy-storage apparatus when the energy-storage apparatus normally supplies electrical devices in a future preset period; obtain current weather information of a location of the energy-storage apparatus; predict weather information of the location of the energy-storage apparatus in the future preset period by inputting the current weather information and parameter information affecting the current weather information into a weather prediction model, where the parameter information affecting the current weather information includes temperature and humidity, the weather prediction model is a model trained with a plurality of sample data, the weather prediction model provides accurate mapping between an input and a desired output, the sample data includes feature data and label data, the label data includes historical weather information in a preset period, and the feature data includes parameter information affecting the historical weather information; generate prompt information or an adjustment scheme of a running strategy for the energy-storage apparatus, according to the current power of the energy-storage apparatus, the power consumption, and the weather information of the location of the energy-storage apparatus in the future preset period; control the energy-storage apparatus according to the adjustment scheme; switching, according to a preset discharge priority, a non-essential electrical device among the electrical devices from a normal operation state to an off state, to enable the energy-storage apparatus to normally supply an essential electrical device, when the current power of the energy-storage apparatus is lower than the power consumption and the number of days of abnormal weather in the weather information in the future preset period is greater than a first preset threshold; charge the energy-storage apparatus continuously until the current power of the energy-storage apparatus is higher than the power consumption; and control continuous discharge of the energy-storage apparatus, when the current power of the energy-storage apparatus is higher than the power consumption and the number of days of normal weather in the weather information in the future preset period is greater than the first preset threshold.

In the third aspect, implementations of the disclosure provide a non-transitory computer-readable storage medium. The non-transitory computer-readable storage medium stores instructions which, when run by at least one processor of an energy-storage apparatus, are operable to execute: obtaining a current power of the energy-storage apparatus, where the energy-storage apparatus supplies power to electrical devices, and establishes a communication connection with a terminal bound to a target user; determining power consumption of the energy-storage apparatus when the energy-storage apparatus normally supplies the electrical devices in a future preset period; obtaining, by a positioning device of the energy-storage apparatus, current weather information of a location of the energy-storage apparatus; predicting weather information of the location of the energy-storage apparatus in the future preset period by inputting the current weather information and parameter information affecting the current weather information into a weather prediction model, where the parameter information affecting the current weather information includes temperature and humidity, the weather prediction model is a model trained with a plurality of sample data, the weather prediction model provides accurate mapping between an input and a desired output, the sample data includes feature data and label data, the label data includes historical weather information in a preset period, and the feature data includes parameter information affecting the historical weather information; generating prompt information or an adjustment scheme of a running strategy for the energy-storage apparatus, according to the current power of the energy-storage apparatus, the power consumption, and the weather information of the location of the energy-storage apparatus in the future preset period; and controlling the energy-storage apparatus according to the adjustment scheme, where the at least one processor configured to execute controlling the energy-storage apparatus according to the adjustment scheme is configured to execute actions, including: switching, according to a preset discharge priority, a non-essential electrical device among the electrical devices from a normal operation state to an off state, to enable the energy-storage apparatus to normally supply an essential electrical device, when the current power of the energy-storage apparatus is lower than the power consumption and the number of days of abnormal weather in the weather information in the future preset period is greater than a first preset threshold; charging the energy-storage apparatus continuously until the current power of the energy-storage apparatus is higher than the power consumption; and controlling continuous discharge of the energy-storage apparatus, when the current power of the energy-storage apparatus is higher than the power consumption and the number of days of normal weather in the weather information in the future preset period is greater than the first preset threshold.

BRIEF DESCRIPTION OF THE DRAWINGS

The following will give a brief description of accompanying drawings used for describing implementations.

DETAILED DESCRIPTION

Hereinafter, implementations of the disclosure will be depicted with reference to accompanying drawings in the implementations.

For ease of understanding, technical terms involved in the implementations of the disclosure will be briefly introduced first.

1. Energy-Storage Apparatus

The energy-storage apparatus is equivalent to a group of large batteries that store electrical energy. There are many types of energy-storage apparatuses, including home energy-storage products. Taking a home energy-storage system as an example, at present, the world's major home energy-storage system market is in the United States and Japan. The living area of Americans is generally relatively large, so households consume more electricity, and the number of households having a new energy generation system such as wind and sunlight is also large. Due to the relatively large electricity consumption and a relatively large price difference between a peak electricity price and a valley electricity price, energy-storage apparatuses are generally used by American households to store electrical energy during a low electricity-price period and used during a high electricity-price period to save electricity costs. In addition, in remote areas and areas where natural disasters such as earthquakes and hurricanes occur frequently, the home energy-storage system may serve as an emergency power supply to avoid inconvenience caused by frequent power outages due to disasters or other reasons.

Figure 1:
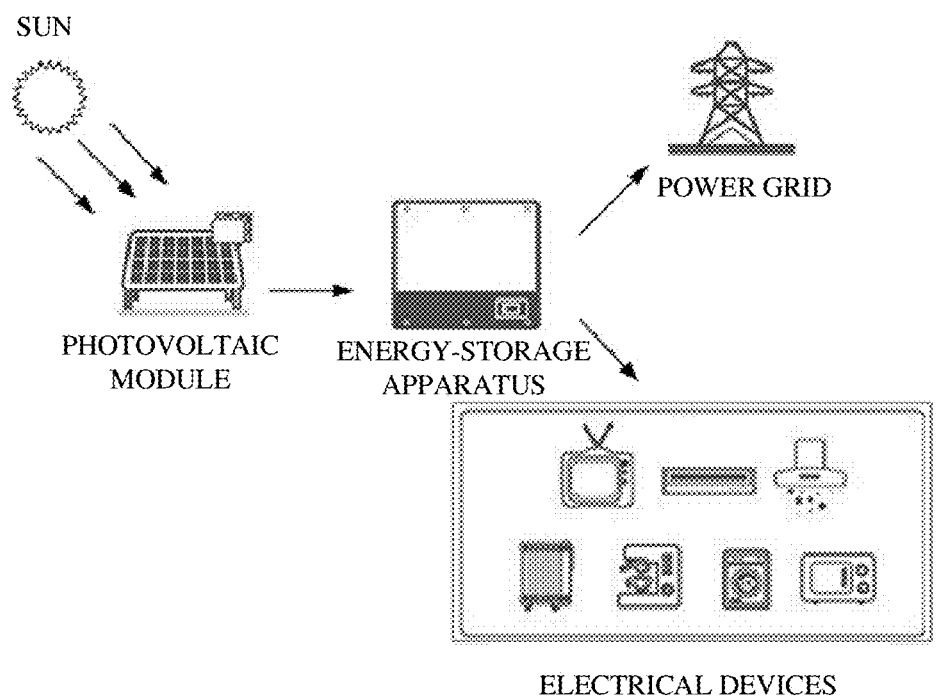
FIG. 1 is an application scenario diagram of an energy-storage apparatus provided in implementations of the disclosure.

Since energy required by people has a strong temporal and spatial nature, in order to use energy reasonably and improve energy utilization, it is necessary to use a device to collect and store excess energy temporarily unused for a time period in a certain way. The stored energy is extracted for use when use of external energy is overloaded, or the stored energy is transported to places where energy is scarce for reuse. Such method is known as energy storage. The current energy-storage (i.e., energy storage) system has a wide range of application scenarios, including grid-side energy storage, renewable energy grid-connected energy storage, and user-side energy storage. Implementations of the disclosure are applied in a scenario of a household energy-storage system in the user-side energy storage. Referring to FIG. 1, FIG. 1 is an application scenario diagram of an energy-storage apparatus provided in implementations of the disclosure. In FIG. 1, a light intensity in the morning is relatively weak, and a photovoltaic module starts to generate energy, but the energy generated is not enough to meet energy demand, so the energy generated by the photovoltaic module is relatively small, multiple electrical devices consume the power generated by photovoltaic module to the greatest extent, and remaining power will be stored in a battery. When the sunlight is insufficient, the battery can supplement electrical energy to the multiple electrical devices. The light intensity at noon is the strongest and family members generally go out to work or participate in other activities, so the electricity demand is relatively small, and the power generated by the photovoltaic module is stored in the battery. After consumption of the multiple electrical devices is satisfied and the battery is fully charged, remaining power will be fed to the power grid. The light intensity at night is relatively weak, so the photovoltaic module generates low energy. Also, relatively more energy is consumed. In this situation, the energy-storage apparatus uses power stored in the battery to provide energy for the multiple electrical devices. In the following, description of implementations of the disclosure will focus on a control scenario of the energy-storage apparatus.

Implementations of the disclosure provide a control method for an energy-storage apparatus and a device, which can intelligently generate prompt information or an adjustment scheme of a running strategy for the energy-storage apparatus, and solve a problem that a user needs to frequently pay attention to whether a power of the energy-storage apparatus is sufficient, which can improve user experience.

In the first aspect, implementations of the disclosure provide a control method for an energy-storage apparatus. The method is applied to the energy-storage apparatus and electrical devices. The energy-storage apparatus supplies power to the electrical devices and includes a high-voltage box and multiple energy-storage modules. The high-voltage box includes a controller. The energy-storage apparatus establishes a communication connection with a terminal bound to a target user. The method includes: obtaining, by the controller, a current power of the energy-storage apparatus; determining, by the controller, power consumption of the energy-storage apparatus when the energy-storage apparatus normally supplies the electrical devices in a future preset period; generating, by the controller, prompt information or an adjustment scheme of a running strategy for the energy-storage apparatus, according to the current power of the energy-storage apparatus, the power consumption, and weather information of a location of the energy-storage apparatus in the future preset period; and controlling, by the controller, the energy-storage apparatus according to the adjustment scheme; controlling, by the controller, the energy-storage apparatus according to the adjustment scheme includes: switching, by the controller, according to a preset discharge priority, a non-essential electrical device among the electrical devices from a normal operation state to an off state, to enable the energy-storage apparatus to normally supply an essential electrical device, when the current power of the energy-storage apparatus is lower than the power consumption and the number of days of abnormal weather in the weather information in the future preset period is greater than a first preset threshold; charging, by the controller, the energy-storage apparatus continuously until the current power of the energy-storage apparatus is higher than the power consumption; and controlling, by the controller, continuous discharge of the energy-storage apparatus, when the current power of the energy-storage apparatus is higher than the power consumption and the number of days of normal weather in the weather information in the future preset period is greater than the first preset threshold.

In the related art, a set running strategy for the energy-storage apparatus is to manage charge and discharge of a power battery in a fixed time period according to a battery management system (BMS). Since this operation mode is relatively fixed and not intelligent enough, it is prone to cause a situation where the user cannot know in time that the remaining power of the energy-storage apparatus is insufficient. The energy-storage apparatus of the disclosure can first obtain the current power, the power consumption when the energy-storage apparatus normally supplies electrical devices in the future preset period, and the weather information of the location of the energy-storage apparatus in the future preset period (e.g., outputted weather information may be weather information in future 15 days, or weather information in future 7 days). Then the energy-storage apparatus generates the prompt information or the adjustment scheme of the running strategy for the energy-storage apparatus based on the above information (the energy-storage apparatus may execute the adjustment scheme, or transmit prompt information to the terminal bound to the target user to prompt the target user to execute the adjustment scheme of the running strategy for the energy-storage apparatus), and then control the energy-storage apparatus according to the adjustment scheme. A specific control process includes the following. If the current power of the energy-storage apparatus is lower than the power consumption and the number of days of abnormal weather in the weather information in the future preset period is greater than the first preset threshold, the energy-storage apparatus will preferentially supply power to an essential electrical device(s), and the energy-storage apparatus is charged continuously through the controller until the current power of the energy-storage apparatus is higher than the power consumption. If the current power of the energy-storage apparatus is higher than the power consumption (e.g., the current power of the energy-storage apparatus is 90%, which is higher than the power consumption 80%) and the number of days of normal weather in the weather information in the future preset period is greater than the first preset threshold (e.g., in the weather information, the number of days with sunny/cloudy and 20° C. —25° C. in future 15 days is 11 days, which is greater than the first preset threshold of 5 days), the energy-storage apparatus is discharged continuously through the controller to normally power the electrical devices. In the disclosure, prompt information or an adjustment scheme of a running strategy corresponding to different situations of the energy-storage apparatus can be outputted, which can solve a problem that a user needs to constantly pay attention to whether a power of the energy-storage apparatus is sufficient, thereby improving user experience.

In a possible implementation, generating, by the controller, the prompt information or the adjustment scheme of the running strategy for the energy-storage apparatus according to the current power of the energy-storage apparatus, the power consumption, and the weather information of the location of the energy-storage apparatus in the future preset period includes: transmitting, by the controller, the prompt information to the terminal bound to the target user, where the prompt information is used to prompt the target user to execute the adjustment scheme of the running strategy for the energy-storage apparatus.

In the above method, after generating the adjustment scheme of the running strategy for the energy-storage apparatus according to the current power of the energy-storage apparatus, the power consumption, and the weather information of the location of the energy-storage apparatus in the future preset period, the energy-storage apparatus can transmit the prompt information to the terminal bound to the target user. Specifically, if the current power of the energy-storage apparatus is lower than the power consumption (e.g., the current power of the energy-storage apparatus, which is 25%, is lower than the power consumption of 80%), and the number of days of abnormal weather in the weather information in the future preset period is greater than the first preset threshold (e.g., the weather information illustrates that the number of days with high temperature red warning in future 15 days, which is 9 days, is greater than the first preset threshold of 5 days), the energy-storage apparatus can transmit the prompt information to the terminal bound to the target user, to make the target user to execute the adjustment scheme of the running strategy for the energy-storage apparatus in advance (e.g., prompting the target user to switch a non-essential electrical device(s) among the electrical devices from a normal operation state to an off state, to make the energy-storage apparatus normally supply an essential electrical device(s), and the energy-storage apparatus is charged continuously until the current power of the energy-storage apparatus is higher than the power consumption), so that the target user can use energy storage reasonably when extreme weather is about to appear.

In another possible implementation, the controller includes a positioning device; before generating, by the controller, the prompt information or the adjustment scheme of the running strategy for the energy-storage apparatus according to the current power of the energy-storage apparatus, the power consumption, and the weather information of the location of the energy-storage apparatus in the future preset period, the method further includes: obtaining, by the positioning device, current weather information of the location of the energy-storage apparatus; and predicting the weather information of the location of the energy-storage apparatus in the future preset period by inputting, by the controller, the current weather information and parameter information affecting the current weather information into a weather prediction model, where the parameter information affecting the current weather information includes temperature and humidity, the weather prediction model is a model trained with multiple sample data, the sample data includes feature data and label data, the label data includes historical weather information in a preset period, and the feature data includes parameter information affecting the historical weather information.

In the above method, in generating the weather information of the location of the energy-storage apparatus in the future preset period by the energy-storage apparatus, model training can be in the following manner. The weather prediction model is obtained by training with multiple obtained sample data of an entire process, where the weather prediction model obtained provides accurate mapping between an input and a desired output, the multiple sample data include feature data and label data, the label data includes historical weather information in a preset period, and the feature data includes parameter information affecting the historical weather information. After training and obtaining the weather prediction model based on the multiple sample data, only data to-be-predicted (including current weather information and parameter information affecting the current weather information) needs to be obtained and then is inputted into the weather prediction model, and the weather information of the location of the energy-storage apparatus in the future preset period can be predicted directly based on the current weather information and the parameter information affecting the current weather information, and the entire process does not need to be re-executed once again. By using the trained model, an efficiency of predicting the weather information of the location of the energy-storage apparatus in the future preset period according to the current weather information and the parameter information affecting the current weather information can be improved.

In yet another possible implementation, the energy-storage apparatus includes an energy-storage base, and the energy-storage base includes a vibration sensor; after generating, by the controller, the prompt information or the adjustment scheme of the running strategy for the energy-storage apparatus according to the current power of the energy-storage apparatus, the power consumption, and the weather information of the location of the energy-storage apparatus in the future preset period, the method further includes: obtaining, by the controller, vibration data collected by the vibration sensor; and executing, by the controller, an instruction of switching a main circuit of the energy-storage apparatus from an on state to an off state, when a threshold of the vibration data is greater than a second preset threshold.

In the above method, the energy-storage apparatus further includes the energy-storage base, where the energy-storage base includes the vibration sensor; after generating, by the controller, the prompt information or the adjustment scheme of the running strategy for the energy-storage apparatus according to the current power of the energy-storage apparatus, the power consumption, and the weather information of the location of the energy-storage apparatus in the future preset period, the energy-storage apparatus can further obtain the vibration data collected by the vibration sensor, and switch the main circuit of the energy-storage apparatus from the on state to the off state if the threshold of the vibration data is greater than the second preset threshold (e.g., the threshold of the vibration data, which is level 4, is greater than the second preset threshold of level 3). In the disclosure, when natural disasters such as earthquakes occur, the energy-storage apparatus can be protected in time according to the data collected by the vibration sensor, which can protect safety of the energy-storage apparatus to the greatest extent.

In yet another possible implementation, the controller further includes a near field communication device; after generating, by the controller, the prompt information or the adjustment scheme of the running strategy for the energy-storage apparatus according to the current power of the energy-storage apparatus, the power consumption, and the weather information of the location of the energy-storage apparatus in the future preset period, the method further includes: verifying an identity of a first user according to identity information of the first user, when the near field communication device detects that a distance between the first user and the energy-storage apparatus is less than a third preset threshold and the first user stays in a range of the distance for more than a fourth preset threshold, where the identity information of the first user includes one or more of fingerprint-image information, iris-image information, and facial-image information; and broadcasting the adjustment scheme of the running strategy for the energy-storage apparatus to the target user, when the identity of the first user is consistent with an identity of the target user bound to the energy-storage apparatus.

In the above method, the controller further includes the near field communication device. After generating, by the controller, the prompt information or the adjustment scheme of the running strategy for the energy-storage apparatus according to the current power of the energy-storage apparatus, the power consumption, and the weather information of the location of the energy-storage apparatus in the future preset period, the energy-storage apparatus further determines the distance between the first user and the energy-storage apparatus upon detecting that the first user is approaching. Upon detecting that the distance between the first user and the energy-storage apparatus is less than the third preset threshold and the first user stays in the range of the distance for more than the fourth preset threshold (e.g., the energy-storage apparatus detects that the distance between the first user and the energy-storage apparatus is 1 m and is less than the third preset threshold of 2 m, and the first user stays in the distance of 1 m for 10 s and is longer than the fourth preset threshold of 5 s), the energy-storage apparatus can further verify the identity of the first user according to the identity information of the first user (e.g., one or more of fingerprint-image information, iris-image information, and facial-image information). If the identity of the first user is consistent with the identity of the target user, it means that the identity verification of the first user passes. In this situation, the energy-storage apparatus can broadcast the adjustment scheme of the running strategy for the energy-storage apparatus to the target user. In the disclosure, when the target user is approaching, the adjustment scheme of the running strategy for the energy-storage apparatus (e.g., an operation state of the energy-storage apparatus and an operation state in the future preset period) can be broadcast automatically, which can improve experience of the target user.

In yet another possible implementation, after generating, by the controller, the prompt information or the adjustment scheme of the running strategy for the energy-storage apparatus according to the current power of the energy-storage apparatus, the power consumption, and the weather information of the location of the energy-storage apparatus in the future preset period, the method further includes: transmitting the adjustment scheme of the running strategy for the energy-storage apparatus to the terminal bound to the target user, when failing to detect that a distance between a first user and the energy-storage apparatus is less than a third preset threshold or an identity of the first user is inconsistent with an identity of the target user bound to the energy-storage apparatus.

In the above method, after generating, by the controller, the prompt information or the adjustment scheme of the running strategy for the energy-storage apparatus according to the current power of the energy-storage apparatus, the power consumption, and the weather information of the location of the energy-storage apparatus in the future preset period, if failing to detect that the distance between the first user and the energy-storage apparatus is less than the third preset threshold (e.g., no one approaches in a range of the third preset threshold of 2 m) or the identity of the first user is inconsistent with the identity of the target user bound to the energy-storage apparatus are inconsistent (e.g., the first user approaches the energy-storage apparatus in the range of the third preset threshold of 2 m, but the energy-storage apparatus determines that the identity of the first user is inconsistent with the identity of the target user after capturing and recognizing facial-image information of the first user), the energy-storage apparatus can transmit the adjustment scheme of the running strategy for the energy-storage apparatus to the terminal bound to the target user. In the disclosure, when someone approaches the energy-storage apparatus, an identity of the one can be recognized. If the approaching one is not the target user, the adjustment scheme of the running strategy for the energy-storage apparatus is transmitted to the terminal bound to the target user.

In the second aspect, implementations of the disclosure provide an energy-storage apparatus. The energy-storage apparatus includes a processor and a memory. The memory stores computer programs which, when executed by the processor, are operable with the processor to execute the foregoing method described in the first aspect to any of the first aspect.

In the third aspect, implementations of the disclosure provide a non-transitory computer-readable storage medium. The non-transitory computer-readable storage medium stores instructions which, when run by at least one processor, are operable to execute the foregoing method described in the first aspect to any of the first aspect.

In a fourth aspect, the disclosure provides a computer program product. The computer program product includes computer instructions which, when run by at least one processor, are operable to execute the foregoing method described in the first aspect to any of the first aspect. The computer program product may be a software installation package. The computer program product may be downloaded and executed on a computing device when the foregoing method needs to be implemented.

For advantageous effects of technical solutions provided in the second aspect to the fourth aspect of the disclosure, reference may be made to advantageous effects of technical solutions in the first aspect, which will not be repeated herein.

Figure 2:
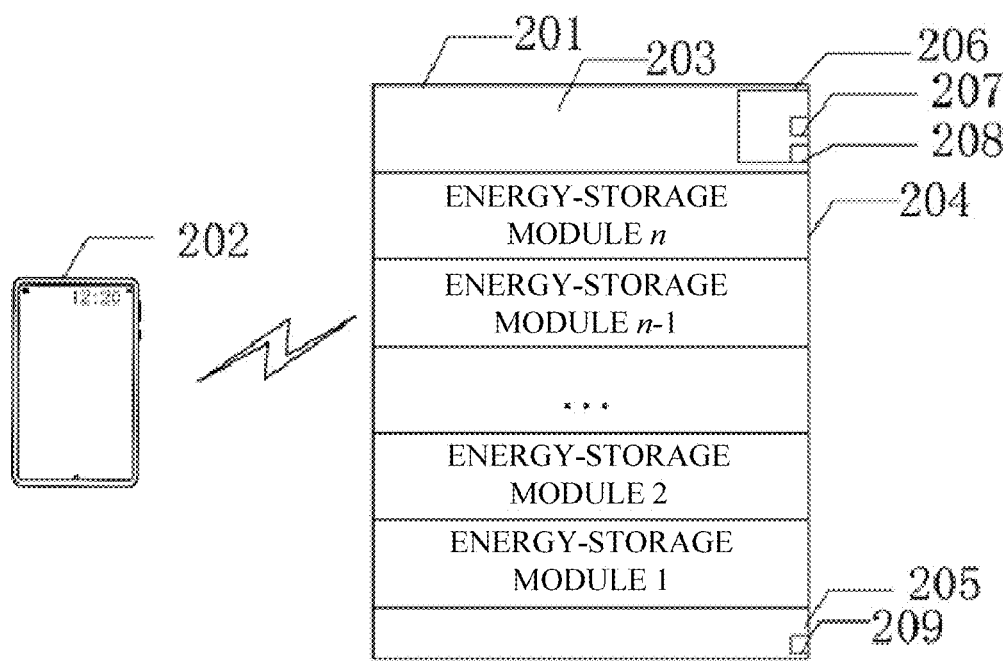
FIG. 2 is a schematic diagram illustrating the system architecture of an energy-storage apparatus provided in implementations of the disclosure.

Referring to FIG. 2, FIG. 2 is a schematic diagram illustrating the system architecture of an energy-storage apparatus provided in implementations of the disclosure. An energy-storage apparatus 201 establishes a communication connection with a terminal 202 bound to a target user. The energy-storage apparatus 201 includes a high-voltage box 203, multiple energy-storage modules 204, and an energy-storage base 205. The high-voltage box 203 includes a controller 206, and the controller 206 includes a positioning device 207 and a near field communication (NFC) device 208. The energy-storage base 205 includes a vibration sensor 209. The energy-storage apparatus 201 is used to implement the following method, such as the method described in the implementation illustrated in FIG. 3.

The energy-storage apparatus 201 has an energy-storage scale of 5-10 kWh, which can be matched with a household photovoltaic system to meet daily electricity demand of a family, and can also realize peak shaving and valley filling and save electricity costs. In implementations of the disclosure, after obtaining, with the controller 206, a current power of the energy-storage apparatus 201 and obtaining, with the positioning device 207, current weather information of a location of the energy-storage apparatus 201, the energy-storage apparatus 201 is configured to predict weather information of the location of the energy-storage apparatus 201 in a future preset period (e.g., outputted weather information may be weather information in future 15 days, weather information in future 7 days, or the like) by inputting the current power of the energy-storage apparatus 201 and the current weather information of the location of the energy-storage apparatus 201 into a weather prediction model; finally, for different situations, the energy-storage apparatus 201 is configured to intelligently output, according to the current power of the energy-storage apparatus 201 and the weather information of the location of the energy-storage apparatus 201 in the future preset period, prompt information or an adjustment scheme of a running strategy for the energy-storage apparatus 201. As such, user experience can be improved.

The controller 206 of the high-voltage box 203 is a module for performing arithmetic operations and/or logical operations. Specifically, the controller 206 may be one or a combination of a central processing unit (CPU), a graphics processing unit (GPU), a microprocessor unit (MPU), an application specific integrated circuit (ASIC), a field programmable gate array (FPGA), a complex programmable logic device (CPLD), an auxiliary processor (to assist the CPU to complete corresponding processing and application), a microcontroller unit (MCU), and other processing modules.

Optionally, the controller 206 may be a processor dedicated to executing the following method (for convenience, it is referred to as "special-purpose processor"), or a processor that executes the following method by invoking computer programs, such as a general-purpose processor. Optionally, at least one controller 206 may also include both a special-purpose processor and a general-purpose processor.

The positioning device 207 is configured to obtain the current weather information of the location of the energy-storage apparatus 201.

The NFC device 208 is configured to detect whether a distance between a first user and the energy-storage apparatus 201 is less than a third preset threshold, and recognize an identity of the first user if the distance between the first user and the energy-storage apparatus 201 is less than the third preset threshold, so that subsequent operations are performed.

The multiple energy-storage modules 204 include multiple battery modules, and the multiple battery modules are configured to charge when there is sunlight or discharge when there is no sunlight.

The vibration sensor 209 can be configured to collect vibration data. If the vibration data is greater than a second preset threshold during an earthquake, the controller 206 is configured to respond to the vibration sensor 209 and switch a main circuit of the energy-storage apparatus 201 from an on state to an off state.

The method in implementations of the disclosure will be depicted in detail below.

Figure 3:
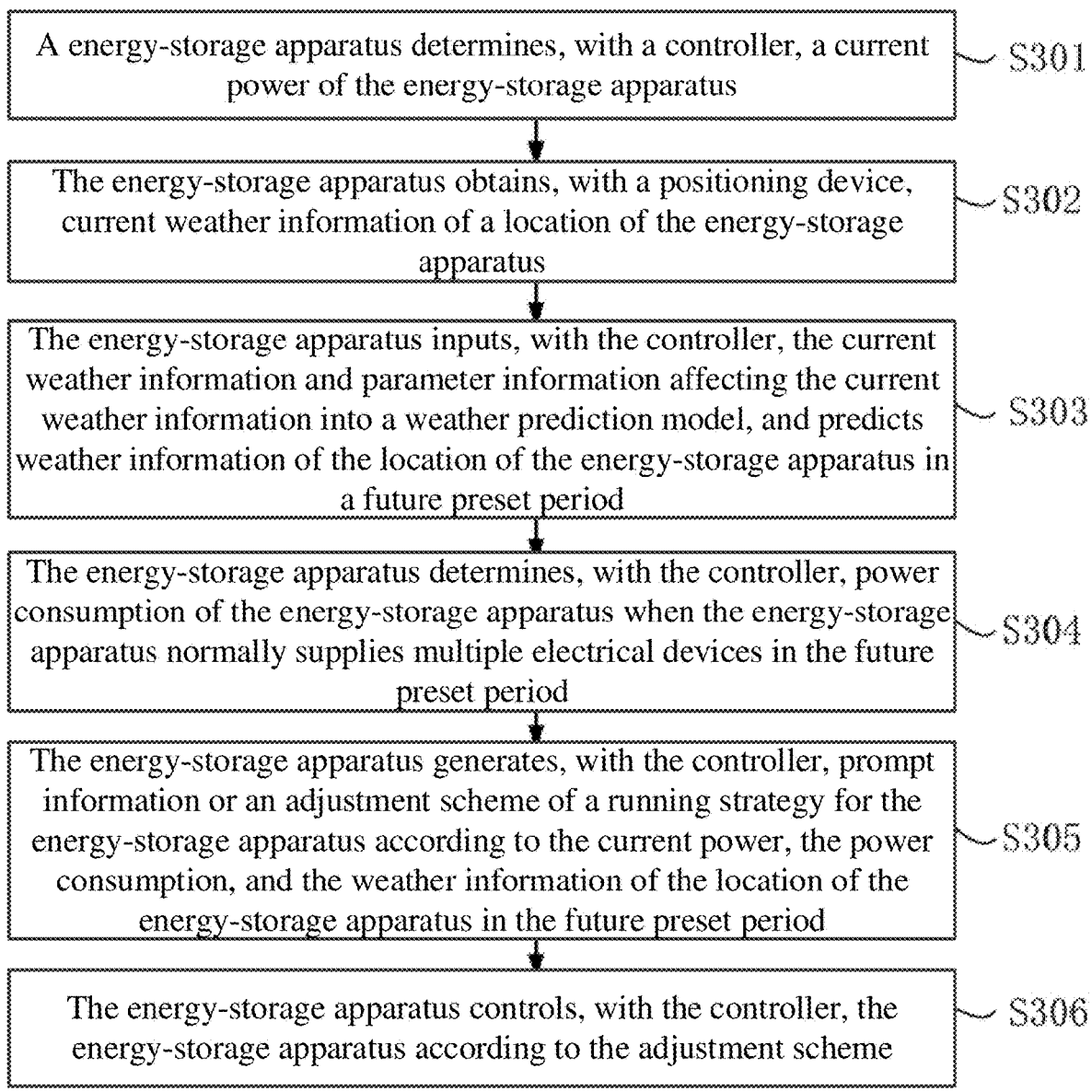
FIG. 3 is a schematic flowchart illustrating a control method for an energy-storage apparatus provided in implementations of the disclosure.

Referring to FIG. 3, FIG. 3 is a schematic flowchart illustrating a control method for an energy-storage apparatus provided in implementations of the disclosure. Optionally, the control method can be applied to the system illustrated in FIG. 2.

The control method for the energy-storage apparatus illustrated in FIG. 3 at least includes operations from S301 to S306.

At S301, the energy-storage apparatus determines, with a controller, a current power of the energy-storage apparatus.

Specifically, after a target user selects a "Battery-Power" function in a function menu of the energy-storage apparatus, the energy-storage apparatus obtains, with the controller, current parameter information of the energy-storage apparatus (e.g., the current parameter information of the energy-storage apparatus includes energy storage: 8 kWh, power: 65%, model: CNFROL a currently connected wireless network: Lynn123) to find the current power of 65%. After determining the current power of the energy-storage apparatus, the energy-storage apparatus can visually output on a display screen the current power of 65% to the target user.

At S302, the energy-storage apparatus obtains, with a positioning device, current weather information of a location of the energy-storage apparatus.

Figure 4:
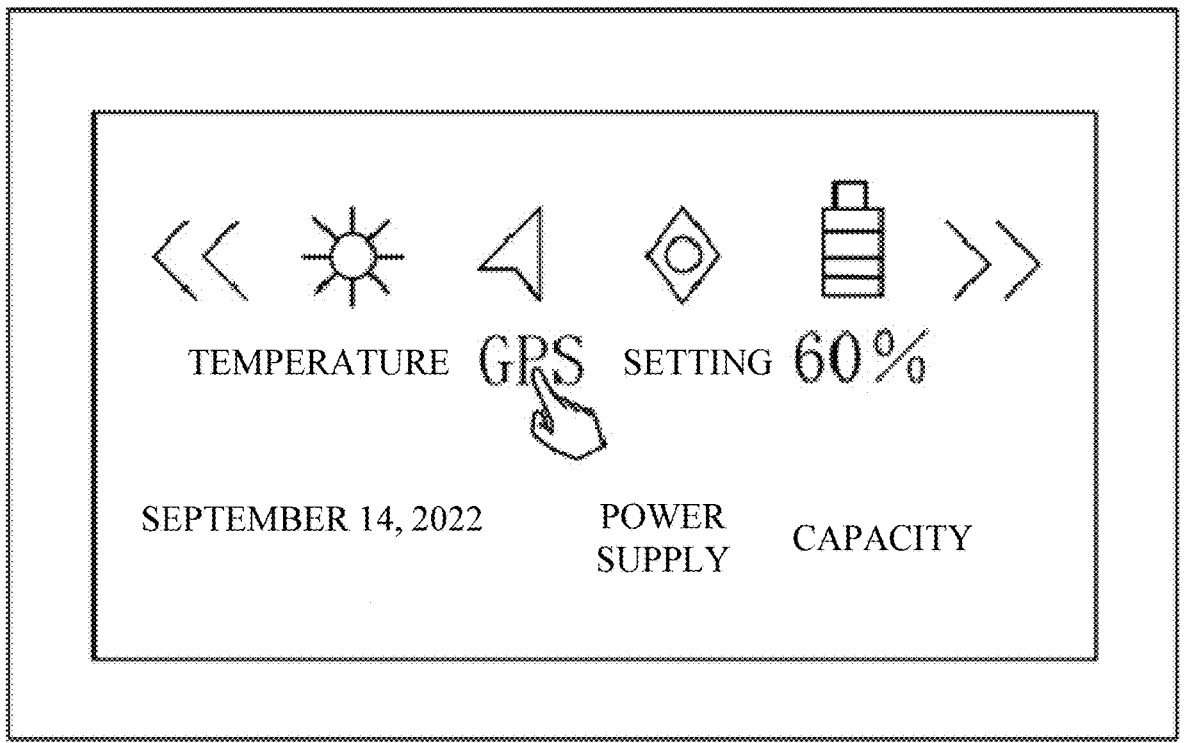
FIG. 4 is a schematic diagram illustrating a function menu of an energy-storage apparatus provided in implementations of the disclosure.

Specifically, the positioning device of implementations of the disclosure may be a global positioning system (GPS) chip, and the energy-storage apparatus needs to use the GPS chip to enable a positioning function. FIG. 4 is a schematic diagram illustrating a function menu of an energy-storage apparatus provided in implementations of the disclosure. As illustrated in FIG. 4, after the target user clicks "GPS" (i.e., to enable the function) in the function menu of the energy-storage apparatus, the GPS chip is powered on to obtain location information of a location of the energy-storage apparatus (e.g., a current location of the energy-storage apparatus at 26° 03' north latitude, 97° 21' east longitude is obtained), at this time, the energy-storage apparatus saves the location information in a memory. Then, the target user clicks the "GPS" again in the function menu of the energy-storage apparatus to disable the function (optionally, the target user can also disable this function in the function menu of the energy-storage apparatus first, and then the energy-storage apparatus saves the location information to the memory). In addition, after the energy-storage apparatus saves the location information of the location of the energy-storage apparatus to the memory, if the geographical location of the energy-storage apparatus does not change much (e.g., the energy-storage apparatus does not move at a same location in a preset period), the energy-storage apparatus does not need to obtain its own location through the GPS chip again. If the energy-storage apparatus needs to be moved again, the location information stored in the memory is updated again through the GPS chip. The target user can disable the "GPS" function in the function menu of the energy-storage apparatus after updating the location information. After obtaining the location information of the location of the energy-storage apparatus, the energy-storage apparatus further obtains the current weather information of the location of the energy-storage apparatus, for example, "September 14th, the air is good 61, the northeast wind is level 1, the humidity is 50%, the body feels 30° C., and the air pressure is 1009hPa".

At S303, the energy-storage apparatus inputs, with the controller, the current weather information and parameter information affecting the current weather information into a weather prediction model, and predicts weather information of the location of the energy-storage apparatus in a future preset period.

The parameter information affecting the current weather information includes at least two of temperature, humidity, terrain, latitude and longitude, etc. The weather prediction model is a model trained with multiple sample data. The sample data includes feature data and label data, the label data includes historical weather information in a preset period, and the feature data includes parameter information affecting the historical weather information.

Specifically, in generating the weather information of the location of the energy-storage apparatus in the future preset period by the energy-storage apparatus, model training can be in the following manner. The weather prediction model is obtained by training with multiple obtained sample data of an entire process, and the weather prediction model obtained provides accurate mapping from an input to a desired output. The energy-storage apparatus can use the parameter information affecting the historical weather information as historical train data (e.g., temperature, humidity, terrain, longitude and latitude that affect weather information in historical/previous 7 days are used as feature information, for instance, the longitude and latitude of the location of the energy-storage apparatus in the historical 7 days is 26° 03' north latitude, 97° 21' east longitude, the temperature in the historical 7 days is in a range of 32° C.-40° C., the humidity in the historical 7 days is in a range of 50%-60%, and the terrain feature is subtropical humid climate zone, mostly basins and mountains, less cloud cover, more sunny days, long sunshine hours). Then, the weather prediction model is trained with the historical train data. After the weather prediction model is trained with the above multiple parameter information affecting the historical weather information, the weather information of the location of the energy-storage apparatus in the future preset period is outputted in a targeted manner. The weather information of the location of the energy-storage apparatus in the future preset period can be outputted in a targeted manner according to the historical weather information collected in different preset periods (e.g., if weather information in historical 15 days is collected by the energy-storage apparatus, the weather prediction model will output corresponding weather information in future 15 days; if weather information in historical 7 days is collected by the energy-storage apparatus, corresponding weather information outputted by the weather prediction model is weather information in future 7 days).

After training and obtaining the weather prediction model based on the multiple sample data, only data to-be-predicted (including current weather information and parameter information affecting the current weather information) needs to be obtained and then is inputted into the weather prediction model, the weather information of the location of the energy-storage apparatus in the future preset period can be predicted directly according to the current weather information and the parameter information affecting the current weather information, and the entire process does not need to be re-executed once again. By using the trained model, an efficiency of predicting the weather information of the location of the energy-storage apparatus in the future preset period according to the current weather information and the parameter information affecting the current weather information can be improved.

At S304, the energy-storage apparatus determines, with the controller, power consumption of the energy-storage apparatus when the energy-storage apparatus normally supplies multiple electrical devices in the future preset period.

Specifically, for example, if a current date is September 1st, the energy-storage apparatus can obtain power consumption (e.g., 78%) of normal supply of daily household devices (e.g., a water heater, an air conditioner, a refrigerator, a TV, a vacuum cleaner, a computer, etc.) in 30 days of August, obtain power consumption (e.g., 81%) of normal supply of daily household devices (e.g., a water heater, an air conditioner, a refrigerator, a TV, a vacuum cleaner, a computer, etc.) in 30 days of July, and obtain power consumption (e.g., 72%) of normal supply of daily household devices (e.g., a water heater, an air conditioner, a refrigerator, a TV, a vacuum cleaner, a computer, etc.) in 30 days of June. Then, power consumption of normal supply of multiple electrical devices in the future preset period can be determined by inputting the above historical data into the trained model (e.g., it is determined that the power consumption of normal supply of daily household devices (such as a water heater, an air conditioner, a refrigerator, a TV, a vacuum cleaner, a computer, etc.) in 30 days of a current month is 80%).

At S305, the energy-storage apparatus generates, with the controller, prompt information or an adjustment scheme of a running strategy for the energy-storage apparatus according to the current power of the energy-storage apparatus, the power consumption, and the weather information of the location of the energy-storage apparatus in the future preset period.

The prompt information is used to prompt the target user to execute the adjustment scheme of the running strategy for the energy-storage apparatus.

It should be noted that, the energy-storage apparatus establishes a connection with the terminal bound to the target user. The connection may be a Bluetooth connection, a wireless connection, an NFC connection, an ultra wide band (UWB) connection, etc., or a connection through other ways. Taking a wireless connection as an example, the energy-storage apparatus and the terminal are connected to a same wireless network.

Specifically, after generating, with the controller, the adjustment scheme of the running strategy for the energy-storage apparatus according to the current power of the energy-storage apparatus, the power consumption, and the weather information of the location of the energy-storage apparatus in the future preset period, the energy-storage apparatus can execute the adjustment scheme; alternatively, after generating the prompt information containing the adjustment scheme of the running strategy for the energy-storage apparatus, prompt information is transmitted to the terminal which is connected to the same wireless network as the energy-storage apparatus and bound to the target user, to prompt the target user to execute the adjustment scheme. In the following, the above two cases will be depicted in detail.

The first case: after the energy-storage apparatus generates the adjustment scheme of the running strategy for the energy-storage apparatus, the energy-storage apparatus executes the adjustment scheme, where generating the adjustment scheme of the running strategy for the energy-storage apparatus includes the following two results.

Further, for the first result, if the current power of the energy-storage apparatus is lower than the power consumption and the number of days of abnormal weather in the future preset period in the weather information is greater than a first preset threshold, the energy-storage apparatus switches, with the controller, according to a preset discharge priority, a non-essential electrical device(s) among multiple electrical devices from a normal operation state to an off state, to make the energy-storage apparatus normally supply an essential electrical device(s); and the energy-storage apparatus is charged continuously through the controller until the current power of the energy-storage apparatus is higher than the power consumption.

As an example, if the current power of the energy-storage apparatus is lower than the power consumption (e.g., the current power of the energy-storage apparatus, which is 25%, is lower than the power consumption of 80%) and the number of days of abnormal weather in the future preset period in the weather information is greater than the first preset threshold (e.g., a current date is September 9th, and a display screen of the energy-storage apparatus displays, during September 14th to September 28th, weather information of 39° C.-44° C./sunny during September 14th to September 22nd, that is, the number of days with high temperature red warning in future 15 days in the weather information, which is 9 days, is greater than the first preset threshold of 5 days), the energy-storage apparatus can switch, according to the preset discharge priority, the non-essential electrical device(s) among the multiple electrical devices from the normal operation state to the off state, so that the energy-storage apparatus can normally supply the essential electrical device(s), and the energy-storage apparatus is charged continuously until the current power of the energy-storage apparatus is higher than the power consumption (e.g., supply of daily household appliances such as a refrigerator, a water heater, and a lamp is preset as a first scheme, supply of mobile electrical devices such as a computer, a mobile phone, and a vacuum cleaner is preset as a second scheme, and all electrical devices other than the listed electrical devices are turned off. If the current power of the energy-storage apparatus on September 12th cannot even meet the first scheme, the energy-storage apparatus will not be used for powering, but will continue to be charged through a photovoltaic module until the power of the energy-storage apparatus is higher than the power consumption, so as to supply electrical energy to household electrical devices in the future to ensure the basic electricity demand and preferentially meet power consumption of important loads when continuous high-temperature weather occurs and the urban area implements power cuts and other operations. By adopting the disclosure, the target user can rationally use energy stored when extreme weather is about to appear, a processing efficiency can be improved, and experience of the target user can be improved.

For the second result, if the current power of the energy-storage apparatus is higher than the power consumption and the number of days of normal weather in the future preset period in the weather information is greater than the first preset threshold, the energy-storage apparatus controls, through the controller, continuous discharge of the energy-storage apparatus.

As an example, if the current power of the energy-storage apparatus is higher than the power consumption (e.g., the current power of the energy-storage apparatus, which is 90%, is higher than the power consumption of 80%) and the number of days of normal weather in the future preset period in the weather information is greater than the first preset threshold (e.g., a current date is October 10th, and a display screen of the energy-storage apparatus displays, during October 11th to October 25th, weather information of 20° C.~25° C. and sunny/cloudy during October 11th to October During 21st, that is, the number of days of normal weather in future 15 days in the weather information, which is 11 days, is greater than the first preset threshold of 5 days), the energy-storage apparatus is discharged continuously through the controller, and multiple electrical devices can be supplied normally (i.e., there is no need to limit to preferentially supply power to electrical devices in the preset first scheme, but multiple electrical devices in the first scheme, the second scheme, and subsequent schemes are all supplied normally). In the disclosure, the adjustment scheme of the running strategy for different situations of the energy-storage apparatus are outputted in a targeted manner, which can solve a problem that a user need to constantly pay attention to whether the stored power is sufficient, thereby improving user experience.

Figure 5:
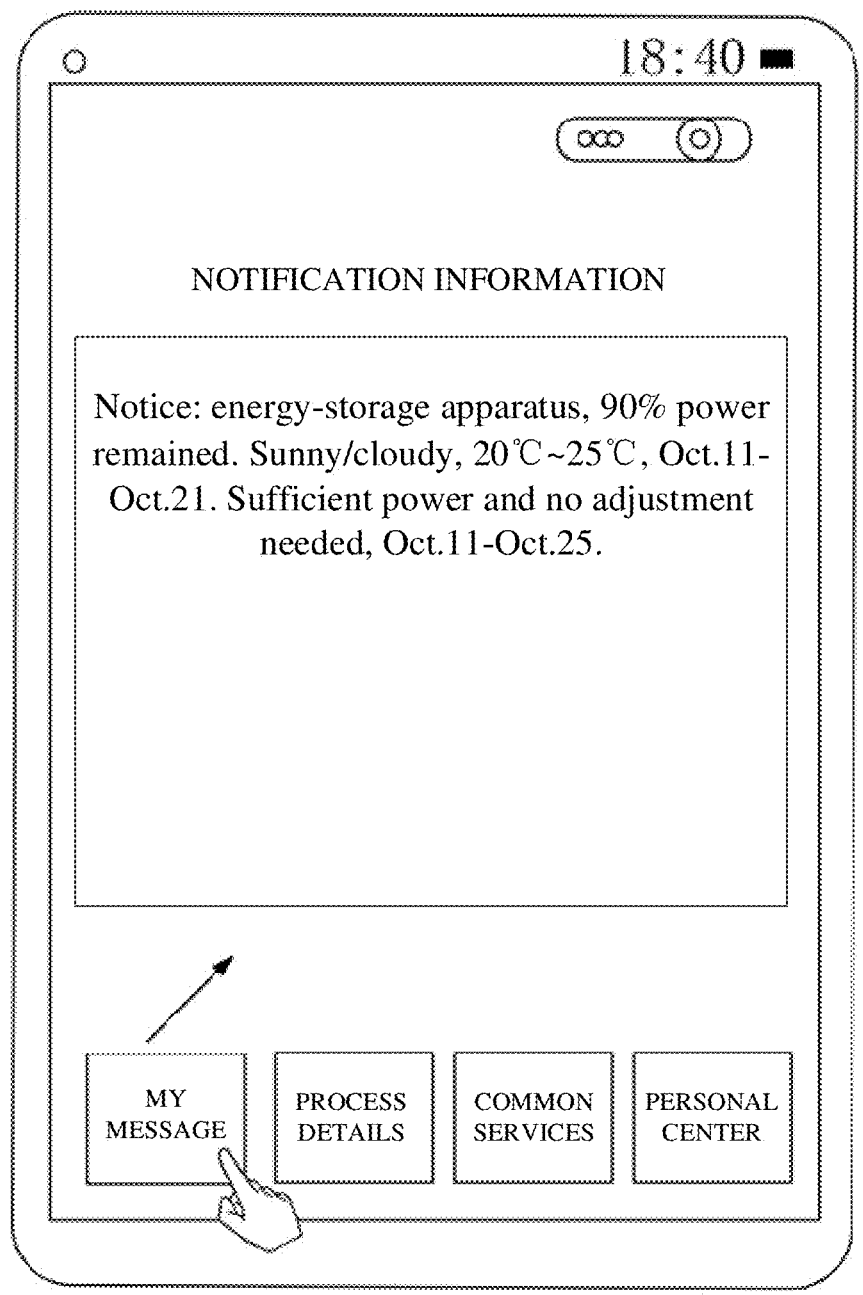
FIG. 5 is a schematic diagram illustrating generated notification information of a running strategy for an energy-storage apparatus provided in implementations of the disclosure.

Optionally, FIG. 5 is a schematic diagram illustrating generated notification information of a running strategy for an energy-storage apparatus provided in implementations of the disclosure. As illustrated in FIG. 5, if the current power of the energy-storage apparatus is higher than the power consumption (e.g., the current power of the energy-storage apparatus, which is 90%, is higher than the power consumption of 80%) and the number of days of normal weather in the future preset period in the weather information is greater than the first preset threshold (e.g., a current date is October 10th, a display screen of the energy-storage apparatus displays, during October 11th to October 25th, weather information of 20° C.~25° C. and sunny/cloudy from October 11th to October 21st, that is, the number of days of normal weather in future 15 days in the weather information, which is 11 days, is greater than the first preset threshold of 5 days), after supplying multiple electrical devices normally by continuously discharging the energy-storage apparatus through the controller according to the adjustment scheme, the energy-storage apparatus can transmit notification information to the terminal bound to the target user, to inform the target user that the energy-storage apparatus has sufficient power during October 11th to October 25th and notify the target user that no adjustment is required.

The second case: after the energy-storage apparatus generates the prompt information containing the adjustment scheme of the running strategy for the energy-storage apparatus, the energy-storage apparatus transmits the prompt information to the terminal bound to the target user, to prompt the target user to execute the adjustment scheme.

Figure 6:
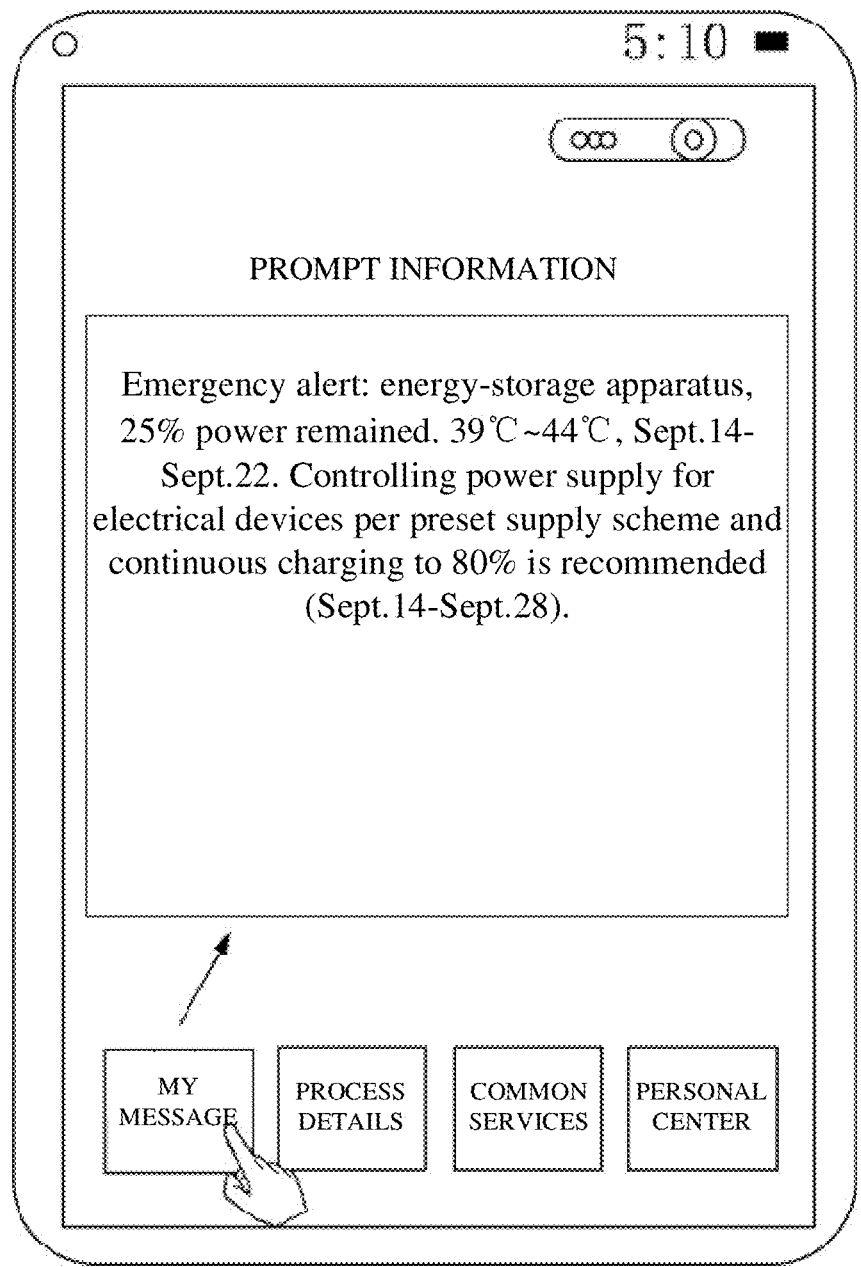
FIG. 6 is a schematic diagram illustrating generated prompt information of a running strategy for an energy-storage apparatus provided in implementations of the disclosure.

As an example, FIG. 6 is a schematic diagram illustrating generated prompt information of a running strategy for an energy-storage apparatus provided in implementations of the disclosure. As illustrated in FIG. 6, if the current power of the energy-storage apparatus is lower than the power consumption (e.g., the current power of the energy-storage apparatus, which is 25%, is lower than the power consumption of 80%) and the number of days of abnormal weather in the future preset period in the weather information is greater than the first preset threshold (e.g., the number of days with high temperature red warning in future 15 days in the weather information, which is 9 days, is greater than the first preset threshold of 5 days), the energy-storage apparatus can transmit prompt information to the terminal bound to the target user, to make the target user execute the adjustment scheme of the running strategy for the energy-storage apparatus in advance (e.g., contents may be "Emergency alert: energy-storage apparatus, 25% power remained. 39° C.~44° C., September14-September22. Controlling power supply for electrical devices per preset supply scheme and continuous charging to 80% is recommended (September14-September28)"), to avoid occurrence of insufficient power supply of the energy-storage apparatus during abnormal weather.

At S306, the energy-storage apparatus controls, with the controller, the energy-storage apparatus according to the adjustment scheme.

Specifically, at S305, the cases of controlling the energy-storage apparatus according to different adjustment schemes have been depicted above one by one, which will not be repeated herein.

Optionally, the energy-storage apparatus includes an energy-storage base, and the energy-storage base includes a vibration sensor; after generating, with the controller, the prompt information or the adjustment scheme of the running strategy for the energy-storage apparatus according to the current power of the energy-storage apparatus, the power consumption, and the weather information of the location of the energy-storage apparatus in the future preset period, the energy-storage apparatus can further obtain, with the controller, vibration data collected by the vibration sensor, and execute, with the controller, an instruction of switching a main circuit of the energy-storage apparatus from an on state to an off state if a threshold of the vibration data is greater than a second preset threshold.

Specifically, after the energy-storage apparatus generates, with the controller, the prompt information or the adjustment scheme of the running strategy for the energy-storage apparatus according to the current power of the energy-storage apparatus, and the power consumption, and the weather information of the location of the energy-storage apparatus in the future preset period, the energy-storage apparatus can further obtain, with the controller, the vibration data collected by the vibration sensor, and execute, with the controller, the instruction of switching the main circuit of the energy-storage apparatus from the on state to the off state in response to determining that the vibration data meets a vibration condition, that is, the threshold of the vibration data is greater than the second preset threshold (e.g., the threshold of the vibration data, which is level 4, is greater than the second preset threshold of level 3). In the disclosure, For scenarios where natural disasters such as earthquakes occur, the energy-storage apparatus can be protected in time according to the data collected by the vibration sensor, which can protect safety of the energy-storage apparatus to the greatest extent.

Optionally, the controller further includes an NFC device; the NFC device of implementations of the disclosure may be an NFC control chip; after generating, with the controller, the prompt information or the adjustment scheme of the running strategy for the energy-storage apparatus according to the current power of the energy-storage apparatus, the power consumption, and the weather information of the location of the energy-storage apparatus in the future preset period, the energy-storage apparatus can further detect whether a distance between a first user and the energy-storage apparatus is within a preset distance range, and verify whether an identity of the first user is consistent with an identity of the target user bound to the energy-storage apparatus, to determine whether to transmit the adjustment scheme of the running strategy of the energy-storage apparatus to the terminal bound to the target user. The above two cases will be depicted in detail below (the first case: the energy-storage apparatus detects that the distance between the first user and the energy-storage apparatus is within the preset distance range and the identity of the first user is consistent with the identity of the target user; the second case: the energy-storage apparatus detects that the distance between the first user and the energy-storage apparatus is not within the preset distance range or detects that the distance between the first user and the energy-storage apparatus is within the preset distance range and the identity of the first user is inconsistent with the identity of the target user).

The first case: if the energy-storage apparatus detects that the distance between the first user and the energy-storage apparatus is less than a third preset threshold and the first user stays in a range of the distance for more than a fourth preset threshold, the identity of the first user is verified according to identity information of the first user; if the identity of the first user is consistent with the identity of the target user bound to the energy-storage apparatus, the adjustment scheme of the running strategy for the energy-storage apparatus is broadcast to the target user; the identity information of the first user includes one or more of fingerprint-image information, iris-image information, and facial-image information.

Specifically, upon detecting that the first user is approaching, the energy-storage apparatus can further determine the distance between the first user and the energy-storage apparatus. Upon detecting that the distance between the first user and the energy-storage apparatus is less than the third preset threshold and the first user stays in the range of the distance for more than the fourth preset threshold (e.g., the energy-storage apparatus detects that the distance between the first user and the energy-storage apparatus, which is 1 m, is less than the third preset threshold of 2 m, and the first user stays in the range of the distance of 1 m for 10 s which is longer than the fourth preset threshold of 5 s), the energy-storage apparatus can further verify the identity of the first user according to the identity information of the first user (e.g., one or more of fingerprint-image information, iris-image information, and facial-image information). If the identity of the first user is consistent with the identity of the target user, it means that the identity verification of the first user passes. In this situation, the energy-storage apparatus can broadcast to the target user the adjustment scheme of the running strategy for the energy-storage apparatus. In the disclosure, the energy-storage apparatus can confirm the identity of the first user when the target user is approaching, and automatically broadcast to the target user the adjustment scheme of the running strategy for the energy-storage apparatus (e.g., an operation state of the energy-storage apparatus and an operation state in the future preset period) after the identity of the first user and the identity of the target user are confirmed, so that it is not necessary to repeatedly transmit the adjustment scheme of the running strategy for the energy-storage apparatus to the terminal bound to the target user, thereby saving resources and improving experience of the target user.

The second case: if the energy-storage apparatus detects that the distance between the first user and the energy-storage apparatus is greater than or equal to the third preset threshold, or the identity of the first user is inconsistent with the identity of the target user bound to the energy-storage apparatus, the adjustment scheme of the running strategy for the energy-storage apparatus is transmitted to the terminal bound to the target user.

Specifically, after generating, with the controller, the prompt information or the adjustment scheme of the running strategy for the energy-storage apparatus according to the current power of the energy-storage apparatus, the power consumption, and the weather information of the location of the energy-storage apparatus in the future preset period, upon detecting that the distance between the first user and the energy-storage apparatus is greater than or equal to the third preset threshold (e.g., no one approaches in a range of the third preset threshold of 2 m), or detecting that the distance between the first user and the energy-storage apparatus is less than the third preset threshold and the identity of the first user is inconsistent with the identity of the target user bound to the energy-storage apparatus (e.g., the first user approaches the energy-storage apparatus in the range of the third preset threshold of 2 m, but the energy-storage apparatus determines that the identity of the first user is inconsistent with the identity of the target user after capturing and recognizing facial-image information of the first user), the energy-storage apparatus transmits the adjustment scheme of the running strategy for the energy-storage apparatus to the terminal bound to the target user. In the disclosure, when someone approaches the energy-storage apparatus, an identity of the one can be recognized. If it is recognized that the first user is not the target user, the adjustment scheme of the running strategy for the energy-storage apparatus is transmitted to the terminal bound to the target user. Since the target user is not within the preset range of the energy-storage apparatus, it is impossible to conveniently broadcast the adjustment scheme of the running strategy for the energy-storage apparatus to the target user directly, in this case, the adjustment scheme of the running strategy for the energy-storage apparatus is transmitted to the terminal bound to the target user.

In the related art, a set running strategy for the energy-storage apparatus is to manage charge and discharge of a power battery in a fixed time period according to a BMS. Since this operation mode is relatively fixed and not intelligent enough, it is prone to cause a situation where the user cannot know in time that the remaining power of the energy-storage apparatus is insufficient. The energy-storage apparatus of the disclosure can first obtain the current power, the power consumption when the energy-storage apparatus normally supplies multiple electrical devices in the future preset period, and the weather information of the location of the energy-storage apparatus in the future preset period (e.g., outputted weather information may be weather information in future 15 days, or weather information in future 7 days). Then the energy-storage apparatus generates the prompt information or the adjustment scheme of the running strategy for the energy-storage apparatus based on the above information (the energy-storage apparatus may execute the adjustment scheme, or transmit prompt information to the terminal bound to the target user to prompt the target user to execute the adjustment scheme of the running strategy for the energy-storage apparatus), and then control the energy-storage apparatus according to the adjustment scheme. A specific control process includes the following. If the current power of the energy-storage apparatus is lower than the power consumption and the number of days of abnormal weather in the future preset period in the weather information is greater than the first preset threshold, the energy-storage apparatus will preferentially supply power to an essential electrical device(s), and the energy-storage apparatus is charged continuously through the controller until the current power of the energy-storage apparatus is higher than the power consumption. If the current power of the energy-storage apparatus is higher than the power consumption (e.g., the current power of the energy-storage apparatus, which is 90%, is higher than the power consumption of 80%) and the number of days of normal weather in the future preset period in the weather information is greater than the first preset threshold (e.g., the number of days with sunny/cloudy and 20° C.~25° C. in future 15 days in the weather information, which is 11 days, is greater than the first preset threshold of 5 days), continuous discharge is performed through the controller to normally power multiple electrical devices. In the disclosure, prompt information or an adjustment scheme of a running strategy corresponding to different situations of the energy-storage apparatus can be outputted, which can solve a problem that a user needs to constantly pay attention to whether a power of the energy-storage apparatus is sufficient, thereby improving user experience.

The disclosure further provides a non-transitory computer-readable storage medium. The non-transitory computer-readable storage medium stores instructions which, when run by at least one processor, are operable to execute the foregoing control method for the energy-storage apparatus, for example, the method illustrated in FIG. 3.

The disclosure further provides a computer program product. The computer program product includes computer instructions which, when executed by a computing device, are operable to execute the foregoing control method for the energy-storage apparatus, for example, the method illustrated in FIG. 3.

In implementations of the disclosure, words such as "for example" or "such as" mean being taken as an example, as an illustration, or as a description. Any implementation or design described as "for example" or "such as" in the disclosure shall not be construed as being preferred or more advantageous than other implementations or designs. Rather, the use of words such as "for example" or "such as" is intended to present related concepts in a concrete manner.

The term "at least one" in implementations of the disclosure refers to one or more, and the term "multiple/a plurality of" refers to two or more. The expression "at least one of the following" or similar expressions refer to any combination of these items, including any combination of single item or plural items. For instance, at least one of a, b, or c can represent: a, b, c, (a and b), (a and c), (b and c), or (a and b and c), where a, b, c each may be singular or plural. The term "and/or" describes an association relationship of associated objects, and indicates that three types of relationships exist. For instance, A and/or B may indicate: A exists alone, both A and B exist, or B exists alone, where A and B each may be singular or plural. The character "/" generally indicates that associated objects before and after the character are in an "OR" relationship.

Unless otherwise stated, the ordinal numerals such as "first", "second", and the like in implementations of the disclosure are used to distinguish multiple objects, rather than describe an order, a timing, a priority, or importance of the multiple objects. As an example, a first device and a second device are only for convenience of description, and do not mean that the first device and the second device are different in structures and importance. In some implementations, the first device and the second device may also be a same device.

As used in the foregoing implementations, in the context, the term "when" may be interpreted as "if . . . ", "after . . . ", "in response to determining that . . . ", or "in response to detecting that . . . ", and the like. The above are only exemplary implementations of the disclosure, which however are not intended to limit the disclosure. Any modifications, equivalent substitutions, or improvements made thereto without departing from spirits and principles of the disclosure shall all be encompassed within the protection of the disclosure.

It will be understood by those of ordinary skill in the art that all or part of the operations of the implementations described above may be accomplished by hardware or by means of a program to instruct associated hardware. The program may be stored in a computer-readable storage medium. The computer-readable storage medium may include a read-only memory (ROM), a magnetic disk or an optical disk, etc.

The above is only specific implementations of the disclosure, and the protection scope of the disclosure is not limited thereto. Any modifications or equivalent substitutions that can be easily thought of by those of ordinary skill in the art without departing from technical scope of the disclosure shall all be encompassed within the protection of the present disclosure.

Therefore, the protection of the disclosure depends on the protection of the claims.

What is claimed is:

1. A control method for an energy-storage apparatus, applied to the energy-storage apparatus and electrical devices, the energy-storage apparatus supplying power to the electrical devices and comprising a positioning device, a high-voltage box, and a plurality of energy-storage modules, the high-voltage box comprising a controller, and the energy-storage apparatus establishing a communication connection with a terminal bound to a target user, the method comprising:

obtaining, by the controller, a current power of the energy-storage apparatus;

determining, by the controller, power consumption of the energy-storage apparatus when the energy-storage apparatus normally supplies the electrical devices in a future preset period;

obtaining, by the positioning device, current weather information of a location of the energy-storage apparatus;

predicting weather information of the location of the energy-storage apparatus in the future preset period by inputting, by the controller, the current weather information and parameter information affecting the current weather information into a weather prediction model, wherein the parameter information affecting the current weather information comprises temperature and humidity, the weather prediction model is a model trained with a plurality of sample data, the weather prediction model provides accurate mapping between an input and a desired output, the sample data comprises feature data and label data, the label data comprises historical weather information in a preset period, and the feature data comprises parameter information affecting the historical weather information;

generating, by the controller, prompt information or an adjustment scheme of a running strategy for the energy-storage apparatus, according to the current power of the energy-storage apparatus, the power consumption, and the weather information of the location of the energy-storage apparatus in the future preset period; and controlling, by the controller, the energy-storage apparatus according to the adjustment scheme, wherein controlling, by the controller, the energy-storage apparatus according to the adjustment scheme comprises:

switching, by the controller, according to a preset discharge priority, a non-essential electrical device among the electrical devices from a normal operation state to an off state, to enable the energy-storage apparatus to normally supply an essential electrical device, when the current power of the energy-storage apparatus is lower than the power consumption and the number of days of abnormal weather in the weather information in the future preset period is greater than a first preset threshold;

charging, by the controller, the energy-storage apparatus continuously until the current power of the energy-storage apparatus is higher than the power consumption; and controlling, by the controller, continuous discharge of the energy-storage apparatus, when the current power of the energy-storage apparatus is higher than the power consumption and the number of days of normal weather in the weather information in the future preset period is greater than the first preset threshold.

2. The method of claim 1, wherein generating, by the controller, the prompt information or the adjustment scheme of the running strategy for the energy-storage apparatus according to the current power of the energy-storage apparatus, the power consumption, and the weather information of the location of the energy-storage apparatus in the future preset period comprises:

transmitting, by the controller, the prompt information to the terminal bound to the target user, wherein the prompt information is used to prompt the target user to execute the adjustment scheme of the running strategy for the energy-storage apparatus.

3. The method of claim 1, wherein the energy-storage apparatus further comprises an energy-storage base, the energy-storage base comprises a vibration sensor, and after generating, by the controller, the prompt information or the adjustment scheme of the running strategy for the energy-storage apparatus according to the current power of the energy-storage apparatus, the power consumption, and the weather information of the location of the energy-storage apparatus in the future preset period, the method further comprises:

obtaining, by the controller, vibration data collected by the vibration sensor; and executing, by the controller, an instruction of switching a main circuit of the energy-storage apparatus from an on state to an off state, when a threshold of the vibration data is greater than a second preset threshold.

4. The method of claim 2, wherein the energy-storage apparatus further comprises an energy-storage base, the energy-storage base comprises a vibration sensor, and after generating, by the controller, the prompt information or the adjustment scheme of the running strategy for the energy-storage apparatus according to the current power of the energy-storage apparatus, the power consumption, and the weather information of the location of the energy-storage apparatus in the future preset period, the method further comprises:

obtaining, by the controller, vibration data collected by the vibration sensor; and executing, by the controller, an instruction of switching a main circuit of the energy-storage apparatus from an on state to an off state, when a threshold of the vibration data is greater than a second preset threshold.

5. The method of claim 1, wherein the controller comprises a near field communication device, and after generating, by the controller, the prompt information or the adjustment scheme of the running strategy for the energy-storage apparatus according to the current power of the energy-storage apparatus, the power consumption, and the weather information of the location of the energy-storage apparatus in the future preset period, the method further comprises:

verifying an identity of a first user according to identity information of the first user, when the near field communication device detects that a distance between the first user and the energy-storage apparatus is less than a third preset threshold and the first user stays in a range of the distance for more than a fourth preset threshold, wherein the identity information of the first user comprises one or more of fingerprint-image information, iris-image information, and facial-image information; and broadcasting the adjustment scheme of the running strategy for the energy-storage apparatus to the target user, when the identity of the first user is consistent with an identity of the target user bound to the energy-storage apparatus.

6. The method of claim 2, wherein the controller comprises a near field communication device, and after generating, by the controller, the prompt information or the adjustment scheme of the running strategy for the energy-storage apparatus according to the current power of the energy-storage apparatus, the power consumption, and the weather information of the location of the energy-storage apparatus in the future preset period, the method further comprises:

verifying an identity of a first user according to identity information of the first user, when the near field communication device detects that a distance between the first user and the energy-storage apparatus is less than a third preset threshold and the first user stays in a range of the distance for more than a fourth preset threshold, wherein the identity information of the first user comprises one or more of fingerprint-image information, iris-image information, and facial-image information; and broadcasting the adjustment scheme of the running strategy for the energy-storage apparatus to the target user, when the identity of the first user is consistent with an identity of the target user bound to the energy-storage apparatus.

7. The method of claim 1, wherein after generating, by the controller, the prompt information or the adjustment scheme of the running strategy for the energy-storage apparatus according to the current power of the energy-storage apparatus, the power consumption, and the weather information of the location of the energy-storage apparatus in the future preset period, the method further comprises:

transmitting the adjustment scheme of the running strategy for the energy-storage apparatus to the terminal bound to the target user, when failing to detect that a distance between a first user and the energy-storage apparatus is less than a third preset threshold or an identity of the first user is inconsistent with an identity of the target user bound to the energy-storage apparatus.

8. The method of claim 2, wherein after generating, by the controller, the prompt information or the adjustment scheme of the running strategy for the energy-storage apparatus according to the current power of the energy-storage apparatus, the power consumption, and the weather information of the location of the energy-storage apparatus in the future preset period, the method further comprises:

transmitting the adjustment scheme of the running strategy for the energy-storage apparatus to the terminal bound to the target user, when failing to detect that a distance between a first user and the energy-storage apparatus is less than a third preset threshold or an identity of the first user is inconsistent with an identity of the target user bound to the energy-storage apparatus.

9. An energy-storage apparatus, comprising:
a transceiver;
a controller; and
a memory, storing computer programs which, when called by the controller, are operable to:
   obtain a current power of the energy-storage apparatus;
   determine power consumption of the energy-storage apparatus when the energy-storage apparatus normally supplies electrical devices in a future preset period;
   obtain current weather information of a location of the energy-storage apparatus;
   predict weather information of the location of the energy-storage apparatus in the future preset period by inputting the current weather information and parameter information affecting the current weather information into a weather prediction model, wherein the parameter information affecting the current weather information comprises temperature and humidity, the weather prediction model is a model trained with a plurality of sample data, the weather prediction model provides accurate mapping between an input and a desired output, the sample data comprises feature data and label data, the label data comprises historical weather information in a preset period, and the feature data comprises parameter information affecting the historical weather information;

generate prompt information or an adjustment scheme of a running strategy for the energy-storage apparatus, according to the current power of the energy-storage apparatus, the power consumption, and the weather information of the location of the energy-storage apparatus in the future preset period;

control the energy-storage apparatus according to the adjustment scheme;

switching, according to a preset discharge priority, a non-essential electrical device among the electrical devices from a normal operation state to an off state, to enable the energy-storage apparatus to normally supply an essential electrical device, when the current power of the energy-storage apparatus is lower than the power consumption and the number of days of abnormal weather in the weather information in the future preset period is greater than a first preset threshold;

charge the energy-storage apparatus continuously until the current power of the energy-storage apparatus is higher than the power consumption; and control continuous discharge of the energy-storage apparatus, when the current power of the energy-storage apparatus is higher than the power consumption and the number of days of normal weather in the weather information in the future preset period is greater than the first preset threshold.

10. The energy-storage apparatus of claim 9, wherein the transceiver is configured to:

transmit the prompt information to a terminal bound to a target user, wherein the prompt information is used to prompt the target user to execute the adjustment scheme of the running strategy for the energy-storage apparatus.

11. A non-transitory computer-readable storage medium, storing instructions which, when run by at least one processor of an energy-storage apparatus, are operable to execute:

obtaining a current power of the energy-storage apparatus, wherein the energy-storage apparatus supplies power to electrical devices, and establishes a communication connection with a terminal bound to a target user;

determining power consumption of the energy-storage apparatus when the energy-storage apparatus normally supplies the electrical devices in a future preset period;

obtaining, by a positioning device of the energy-storage apparatus, current weather information of a location of the energy-storage apparatus;

predicting weather information of the location of the energy-storage apparatus in the future preset period by inputting the current weather information and parameter information affecting the current weather information into a weather prediction model, wherein the parameter information affecting the current weather information comprises temperature and humidity, the weather prediction model is a model trained with a plurality of sample data, the weather prediction model provides accurate mapping between an input and a desired output, the sample data comprises feature data and label data, the label data comprises historical weather information in a preset period, and the feature data comprises parameter information affecting the historical weather information;

generating prompt information or an adjustment scheme of a running strategy for the energy-storage apparatus, according to the current power of the energy-storage apparatus, the power consumption, and the weather information of the location of the energy-storage apparatus in the future preset period; and controlling the energy-storage apparatus according to the adjustment scheme, wherein the at least one processor configured to execute controlling the energy-storage apparatus according to the adjustment scheme is configured to execute actions, comprising:

switching, according to a preset discharge priority, a non-essential electrical device among the electrical devices from a normal operation state to an off state, to enable the energy-storage apparatus to normally supply an essential electrical device, when the current power of the energy-storage apparatus is lower than the power consumption and the number of days of abnormal weather in the weather information in the future preset period is greater than a first preset threshold;

charging the energy-storage apparatus continuously until the current power of the energy-storage apparatus is higher than the power consumption; and controlling continuous discharge of the energy-storage apparatus, when the current power of the energy-storage apparatus is higher than the power consumption and the number of days of normal weather in the weather information in the future preset period is greater than the first preset threshold.

12. The non-transitory computer-readable storage medium of claim 11, wherein the at least one processor configured to execute generating the prompt information or the adjustment scheme of the running strategy for the energy-storage apparatus according to the current power of the energy-storage apparatus, the power consumption, and the weather information of the location of the energy-storage apparatus in the future preset period is configured to execute actions, comprising:

transmitting the prompt information to the terminal bound to the target user, wherein the prompt information is used to prompt the target user to execute the adjustment scheme of the running strategy for the energy-storage apparatus.

13. The non-transitory computer-readable storage medium of claim 11, wherein after generating the prompt information or the adjustment scheme of the running strategy for the energy-storage apparatus according to the current power of the energy-storage apparatus, the power consumption, and the weather information of the location of the energy-storage apparatus in the future preset period, the at least one processor is further configured to execute actions, comprising:

obtaining vibration data collected by a vibration sensor of the energy-storage apparatus; and executing an instruction of switching a main circuit of the energy-storage apparatus from an on state to an off state, when a threshold of the vibration data is greater than a second preset threshold.

14. The non-transitory computer-readable storage medium of claim 12, wherein after generating the prompt information or the adjustment scheme of the running strategy for the energy-storage apparatus according to the current power of the energy-storage apparatus, the power consumption, and the weather information of the location of the energy-storage apparatus in the future preset period, the at least one processor is further configured to execute actions, comprising:

obtaining vibration data collected by a vibration sensor of the energy-storage apparatus; and executing an instruction of switching a main circuit of the energy-storage apparatus from an on state to an off state, when a threshold of the vibration data is greater than a second preset threshold.

15. The non-transitory computer-readable storage medium of claim 11, wherein after generating the prompt information or the adjustment scheme of the running strategy for the energy-storage apparatus according to the current power of the energy-storage apparatus, the power consumption, and the weather information of the location of the energy-storage apparatus in the future preset period, the at least one processor is further configured to execute actions, comprising:

verifying an identity of a first user according to identity information of the first user, when a near field communication device of the energy-storage apparatus detects that a distance between the first user and the energy-storage apparatus is less than a third preset threshold and the first user stays in a range of the distance for more than a fourth preset threshold, wherein the identity information of the first user comprises one or more of fingerprint-image information, iris-image information, and facial-image information; and broadcasting the adjustment scheme of the running strategy for the energy-storage apparatus to the target user, when the identity of the first user is consistent with an identity of the target user bound to the energy-storage apparatus.

16. The non-transitory computer-readable storage medium of claim 12, wherein after generating the prompt information or the adjustment scheme of the running strategy for the energy-storage apparatus according to the current power of the energy-storage apparatus, the power consumption, and the weather information of the location of the energy-storage apparatus in the future preset period, the at least one processor is further configured to execute actions, comprising:

verifying an identity of a first user according to identity information of the first user, when a near field communication device of the energy-storage apparatus detects that a distance between the first user and the energy-storage apparatus is less than a third preset threshold and the first user stays in a range of the distance for more than a fourth preset threshold, wherein the identity information of the first user comprises one or more of fingerprint-image information, iris-image information, and facial-image information; and broadcasting the adjustment scheme of the running strategy for the energy-storage apparatus to the target user, when the identity of the first user is consistent with an identity of the target user bound to the energy-storage apparatus.

17. The non-transitory computer-readable storage medium of claim 11, wherein after generating the prompt information or the adjustment scheme of the running strategy for the energy-storage apparatus according to the current power of the energy-storage apparatus, the power consumption, and the weather information of the location of the energy-storage apparatus in the future preset period, the at least one processor is further configured to execute actions, comprising:

transmitting the adjustment scheme of the running strategy for the energy-storage apparatus to the terminal bound to the target user, when failing to detect that a distance between a first user and the energy-storage apparatus is less than a third preset threshold or an identity of the first user is inconsistent with an identity of the target user bound to the energy-storage apparatus.

18. The non-transitory computer-readable storage medium of claim 12, wherein after generating the prompt information or the adjustment scheme of the running strategy for the energy-storage apparatus according to the current power of the energy-storage apparatus, the power consumption, and the weather information of the location of the energy-storage apparatus in the future preset period, the at least one processor is further configured to execute actions, comprising:

transmitting the adjustment scheme of the running strategy for the energy-storage apparatus to the terminal bound to the target user, when failing to detect that a distance between a first user and the energy-storage apparatus is less than a third preset threshold or an identity of the first user is inconsistent with an identity of the target user bound to the energy-storage apparatus.

\* \* \* \* \*